United States Patent

[11] 3,617,565

| [72] | Inventor | Hans Erik Fahlvik<br>Rudsjostrand 5F, 802 40 Gavle, Sweden |
|---|---|---|
| [21] | Appl. No. | 731,799 |
| [22] | Filed | May 24, 1968 |
| [45] | Patented | Nov. 2, 1971 |
| [32] | Priority | May 26, 1967 |
| [33] | | Sweden |
| [31] | | 7,463/67 |

[54] METHOD AND MEANS FOR THE ABSORPTION OF PETROLEUM PRODUCTS
11 Claims, 2 Drawing Figs.

[52] U.S. Cl. ..................................... 210/40,
210/484, 210/500, 210/DIG. 21
[51] Int. Cl. ......................................... E02b 15/04
[50] Field of Search........................... 252/427,
24, 39; 210/40, 500, 502, 503

[56] References Cited
UNITED STATES PATENTS

| 2,033,698 | 3/1936 | Finn | 210/502 X |
|---|---|---|---|
| 2,367,384 | 1/1945 | Tymstra et al. | 210/DIG. 21 |
| 2,464,204 | 3/1949 | Baker | 210/DIG. 21 |
| 3,382,170 | 5/1968 | Pape | 210/DIG. 21 |

FOREIGN PATENTS

| 979,978 | 1/1965 | Great Britain | 210/DIG. 21 |

Primary Examiner—Samih N. Zaharna
Attorney—Fred C. Philpitt

ABSTRACT: The absorption of petroleum products is attained by bringing bark from trees belonging to the order Coniferae into contact with the petroleum products. The absorption facilitates the collection and removal of the products from a substrate such as a water surface or a solid base.

METHOD AND MEANS FOR THE ABSORPTION OF PETROLEUM PRODUCTS

The present invention relates to the absorption of liquid petroleum products including crude oil, lubricating oil, kerosene, gasoline and similar products which are nonsoluble in water, and the main object of the invention is to facilitate the collection and removal of such products form substrate, e.g., water surface or a solid base.

A method for absorption of petroleum products according to the invention is characterized in that a material essentially consisting of bark from predetermined species of tree is brought into contact with the petroleum product.

Especially suitable for the purpose of the present invention is bark from older tree trunks having a thick, ripping bark layer, the thickness of which being at least 5 mm., preferably at least 10 mm., said bark having a relatively low appearent density and having the capability of floating on water for a prolonged period, such as at least 10 hours, preferably at least 20 hours.

Bark having the properties mentioned above can be selected from trees of various species. Particularly suitable, however, is bark from trees belonging to the order Coniferae especially those belonging to the families Pinaceae and Taxodiceae. A very suitable material for the absorption of various petroleum products is bark from trees of the genus Pinus such as pine, *Pinus silvatica*, and similar species, e.g., *Pinus ponderosaPinus strobus, Pinus nigra* and *Pinus taeda*. Suitable bark can also be obtained from trees belonging to the genuses Abies, Tsuga, Pseudotsuga and Picea, such as *Abies alba*, *Abies Concolor, Tsuga mertensiana*, Tsuga *canadensis*, Pseudotsuga *taxifolia* (*P. douglasii*), Pseudotsuga *viridis* and Pseudotsuga *glauca, Picea abies, Picea pungens*. Of the family Taxodiaceae the species *Sequoia sempervirens* may be mentioned as a source of suitable bark for the purpose of the invention. On the other hand the very light bark from the ordinary cork oak has proved to have inferior oil absorption properties. It has surprisingly proved that bark from trees of the firstmentioned species has an exceptional capacity of absorbing petroleum products at a fast rate. This capacity remains even if the bark has become moist, however, to somewhat lesser degree.

The bark can be ground or divided or comminuted in larger pieces according to the purpose for which it is to be used. For general use according to the present invention the bark can be ground to particle sizes passing through a sieve with a mesh width of approximately 2 cm., it being understood, however, that the presence of a limited quantity of larger bark particles may be tolerated. Larger bark particles or pieces such as pieces the overall cross section dimension of which averages 2 –30 cm. preferably approximately 2 –15 cm. are suitable for special purposes as will be described below.

When the bark containing material is to be used according to the present invention for taking up a petroleum product which is spread on a water surface, the material is spread onto or laid as a barrier in front of the area covered by the petroleum product. As soon as the latter has come into contact with the bark, the petroleum product is absorbed and floating patches or strings of bark with large quantities of absorbed oil are formed which can readily be collected and disposed of. The bark, when used in sufficient quantities, is so effective that only neglectable traces of the petroleum product remain on the water surface after the treatment described.

The removal of petroleum products from a solid substrate e.g., a floor or the ground, is carried out by spreading the bark mass on the petroleum product, whereafter the bark mass is swept up and removed after having quickly absorbed the petroleum product.

The collected bark with the absorbed petroleum product can be readily disposed of by burning and is a valuable fuel.

For increasing the floating properties of the bark the latter can be dried e.g., by means of heated drying air. The drying should be carried on until the dry weight of the bark has exceeded 50 percent, preferably 60 percent of the total weight of the moisture containing bark. The drying will also improve the storing properties and facilitate the transportation of the bark product.

It is known to contain the propagation of oil patches on water by means of an elongate floating barrier. According to the present invention this barrier can be formed of bark as shown on the accompanying drawing.

In the drawing

Figure 1:
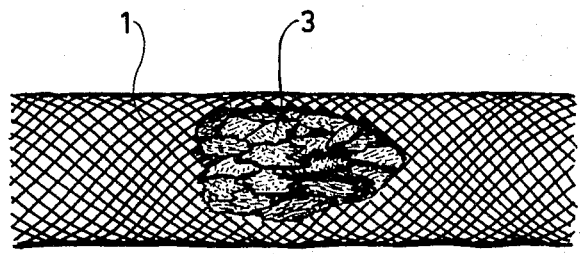
FIG. 1 shows a section of a barrier according to the invention.

In FIG. 1 the reference numeral 1 indicates a tubular net or hose of plastic material or a textile material enclosing bark pieces 3. The net can have rather wide meshes, e.g., a mesh width of at least about 2 cm so that even very thick crude oil can pass rapidly through the net and into the bark filling which absorbes the oil effectively and prevents its passage through the barrier. The diameter of the cross section of the barrier can be, for instance, 15–50 cm. and its length can be chosen as desired.

Figure 2:
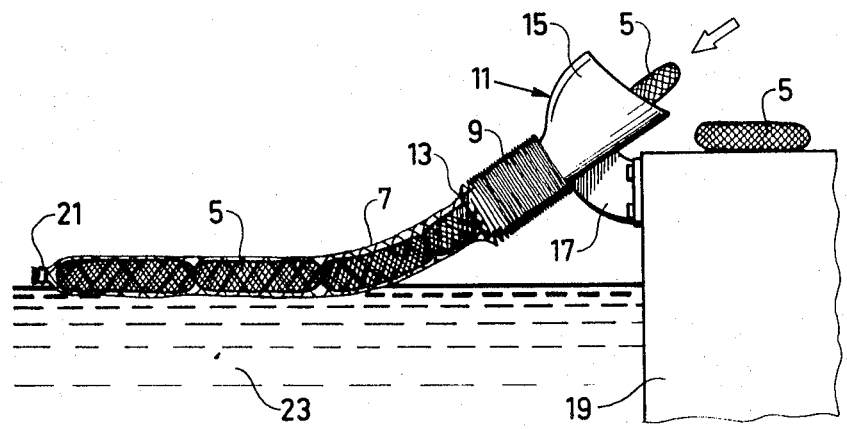
FIG. 2 shows schematically and in side elevation a device for producing a barrier consisting of a plurality of prefabricated barrier units.

A long barrier according to the invention can be produced in the manner indicated in FIG. 2, in which the reference numeral 5 indicates barrier units having a length of about 1 m. and consisting of bark pieces enclosed in a tubular net which is closed at both ends. This net can have fine meshes and may consist of thin threads of plastic or the like. The barrier units 5 are fed down into a hopper 15 of a device 11 which may be placed on or secured to a quay or a ship 19 a portion of which is shown in FIG. 2. The device 11 has a pipe 13 forming a prolongation or extension of the hopper 15. Around said pipe 13 a store 9 of a larger net hose 7 is applied. This net hose may consist of relatively thick threads or filaments of a plastic such as nylon having high tensile strength so that the hose or tubular net 7 can stand considerable traction forces without bursting. During the feeding of the units 5 into the device 11 the hose 7 is drawn out while floating on the water 23 e.g., by means of a tug connected to the closed free end 21 of the hose 7, and after a sufficient length of the barrier thus formed, in which the units 5 abut each other, has been obtained, the barrier is moved to an area polluted by oil where it can be brought to surround the oil spot or be laid as a barrier for the protection of a coastal line against the drifting oil spot.

Alternatively a barrier of the units 5 can be formed by connecting the units 5 in series and in close contact with each other by means of a line extending along the barrier so formed to which line or rope said units may be detachably connected.

Tree bark being a cheap product and presenting a surprisingly high capacity of absorbing petroleum products and the like, not least gasoline and similar light hydrocarbons, and also allowing for a convenient and substantially complete absorption of the petroleum product, the present invention provides considerable advantages in economical practical and safety-technical respects.

What I claim is:

1. A method for the absorption of liquid petroleum products characterized in that a material consisting essentially of dried and comminuted bark from trees belonging to the order Coniferae is added to a water surface and is brought into contact with said petroleum products in order to remove petroleum products therefrom, and subsequently collecting said bark after it has absorbed at least some of said petroleum product.

2. The method of claim 1 wherein said bark is from trees belonging to the Pinaceae family.

3. The method of claim 1 wherein said bark is from trees belonging to the Taxodiaceae.

4. The method of claim 1 wherein said bark is from trees belonging to the genus Pinus.

5. The method according to claim 1 wherein said bark is from trees selected from the group of species consisting of *Pinus silvatica, Pinus ponderosa, Pinus strobus, Pinus nigra, Pinus taeda*, and mixtures thereof.

6. The method according to claim 1 wherein said bark is from trees selected from the group of species consisting of *Abies alba, Abies concolor, Tsuga canadensis, Pseudotsuga douglasii, Pseudotsuga viridis, Pseudotsuga glauca, Picea abies, Picea pungens* and mixtures thereof.

7. The method of claim 1 wherein said bark is from trees of the species *Sequoia sempervirens*.

8. The method of claim 1 wherein said bark mainly consists of bark taken from tree trunks having a ripping bark layer the average thickness of which being at least 5 mm., said bark having the ability of floating on water for a period of at least 10 hours.

9. The method of claim 1 wherein said bark consists essentially of ground bark the particles of which can be passed through a sieve having a mesh width of approximately 2 cm.

10. The method of claim 1 wherein said bark consists essentially of bark pieces of the overall cross section dimension of which as an average being larger than approximately 2 cm.

11. The method of claim 20 wherein said bark is enclosed in a tubular net the diameter of which is at least 15 cm.

* * * * *